May 24, 1960   W. H. NEWELL   2,937,808
RADAR MACH METER AND ANGLE OF ATTACK OR YAW METER
Filed Jan. 17, 1955

United States Patent Office 2,937,808
Patented May 24, 1960

2,937,808

RADAR MACH METER AND ANGLE OF ATTACK OR YAW METER

William H. Newell, Mount Vernon, N.Y., assignor to Sperry Rand Corporation, a corporation of Delaware Filed Jan. 17, 1955, Ser. No. 482,154

1 Claim. (Cl. 235—61)

This invention relates to a process for semi-automatically determining certain flight characteristics of aircraft by the use of radar, the process being particularly adapted to finding Mach numbers and angles of attack and yaw. It also relates to a specific mechanism for performing the process.

An absolute condition for successfully effecting solutions is that the velocity of the plane be in excess of the velocity of sound for the prevailing conditions of air pressure and density. For these velocities the more conventional methods for determining flight characteristics, as by Pitot tubes, fails due to the unpredictability of determining the relative pressures in the vicinity of the aircraft at these speeds.

When a plane is flown above the velocity of sound, a shock wave front emanating from the bow of the plane is produced. The resulting shock wave creates atmospheric turbulences in the vicinity of the plane causing changes in the relative air densities which are sufficient to reflect a radar beam back to its source. The location of the wave front with respect to the axis of the aircraft is dependent on the speed of the plane and the prevailing atmospheric conditions including air pressure and density. In fact the angle defined by the wave front at the plane's bow is indicative of the Mach number for these conditions of flight. Hence the location of the wave front as by radar enables one to determine this number.

The basic reference quantity employed by the invented process and computer is the line of flight. For the purpose of these solutions the line of flight is defined as the direction of motion of the aircraft with respect to the air. It is an object of the invention to determine angles by either the horizontal or vertical plane defined by the line of flight and the longitudinal axis of the aircraft when the heading is offset from the line of flight. This lack of coincidence between the axis and the line of flight may be the result of side slippage and inertia which exist while the aircraft is maneuvering. Some angle of attack is normally present to increase buoyancy in level flight. The computed angular quantities are especially relevant to finding solutions in fire control problems.

It is recognized that the defined line of flight of the aircraft bisects the angle defined by the shock wave front in any plane intersecting the line of flight and the conical side of the shock wave. Therefore locating the radar proximate the rear of the plane and measuring the difference in distance normal to the wave front on each side of the airplane by means of the deflected beam would give rise to a fairly accurate approximation of the extent the aircraft heading is offset from the line of flight. If this angle is measured in the horizontal plane, it may be designated the angle of yaw. If measured in the vertical plane, it may be designated the angle of attack.

A more accurate determination of yaw or attack angle may be derived from the shock wave front angle which also gives an indication of the Mach number for the plane's speed. Since the line of flight bisects the angle defined by the shock wave front, this bisected angle may be taken as a reference quantity to derive other values useful for flight information such as angle of yaw. Suitable mechanism is provided to make the necessary calculations.

Another object of the invention is to provide a process for calculating Mach number.

A further object is to provide a process for roughly determining angles of attack and yaw for aircraft being operated at over sound velocity.

Another object is to provide a process for deriving angle of yaw or attack from the angle defined by a shock wave front created by an aircraft being flown over sound velocity.

Other objects may appear from the following description in conjunction with the accompanying drawings in which.

Figure 1:
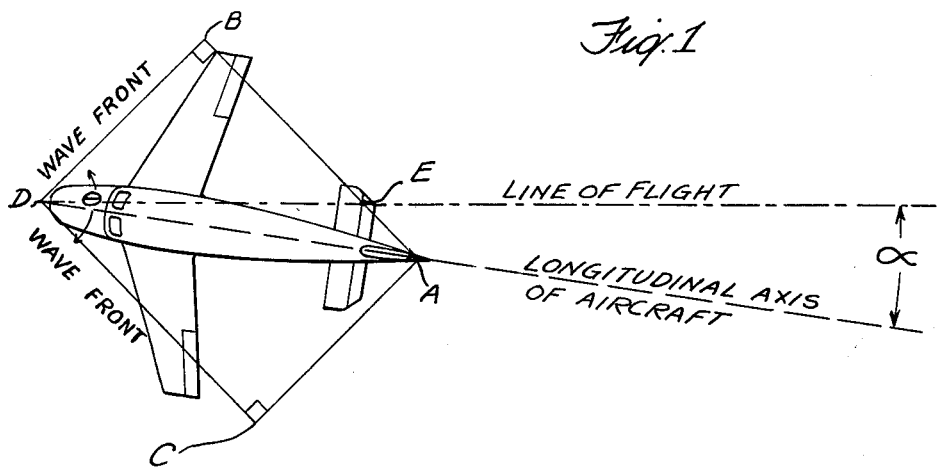
Fig. 1 is a graphic illustration of the flight quantity, designated angle of yaw, which is solved by the invented embodiment.
Figure 2:
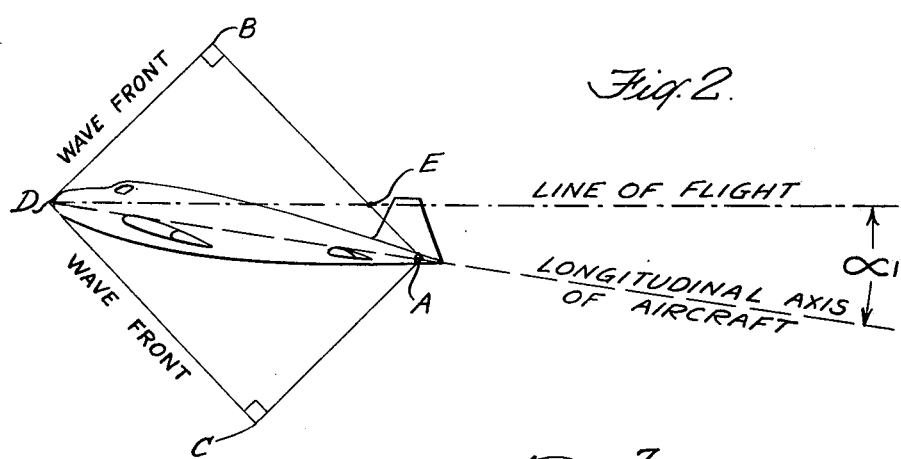
Fig. 2 is a graphic illustration of the flight quantity, designated angle of attack which is also solved by the computer.
Figure 3:
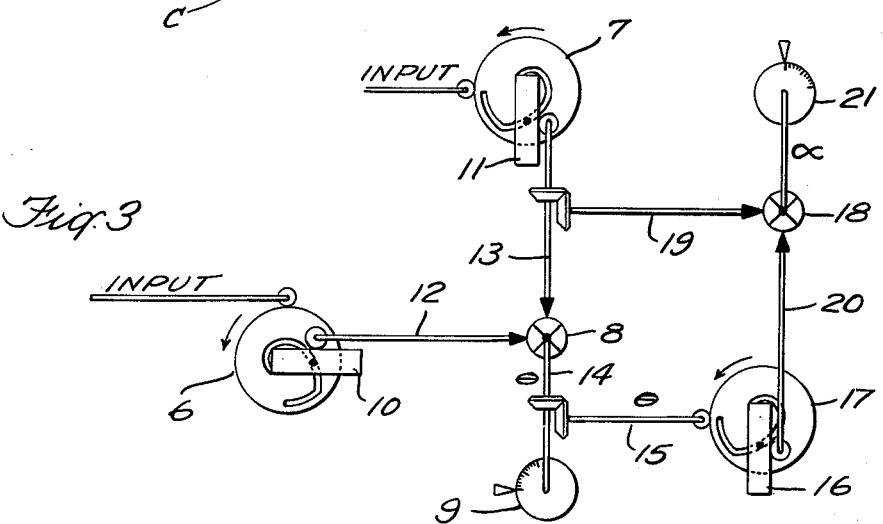
Fig. 3 is a schematic showing of the computer elements employed for the solutions.

As shown in the drawings a radar is shown as located in the rear section of an aircraft at A. Assuming the plane is being flown at a rate to exceed the velocity of sound, a shock wave front BD and CD is created. The wave front emanates from D which is situated at the bow or nose of the flying aircraft. The line of flight for the plane is taken along the line DE which bisects the angle between the sides of the wave front.

The Mach number may be defined as the ratio of the plane's air speed to the velocity of sound for the prevailing conditions of flight. Generally as the plane increases its atlitude the Mach number increases with constant air speed since velocity of sound diminishes with increasing altitude. For Mach numbers over unity the resulting shock wave front bears a recognized relation to the Mach number, and, in fact, the angle between the two sides of the shock wave yields a direct indication of this number for the speed of the aircraft.

As shown in Fig. 1 a radar transmitter is located at A and AD is the distance the transmitter is located from the plane's nose. The angle defined by the sides of the shock wave front is Mach angle $\theta$. This is the sum of angles BDA and CDA. BA and CA are the shortest distances from the plane's radar to the shock wave front. Therefore $\theta$ is equal to $$\text{arc sin } \frac{CA}{AD} + \text{arc sin } \frac{BA}{AD}$$

To find $\theta$ the operator need only observe the distances BA and CA on the radar scope after the plane has reached a speed capable of generating a shock wave. He then feeds the ratios $CA/AD$ and $BA/AD$ into a pair of arc sin cams 6 and 7. The two resulting quantities are then added as by means of a differential 8, the total being shown by indicator 9 to which the differential 8 is connected by shaft 14. Radial followers 10 and 11, which are in driven contact with the grooves in cams 6 and 7, drive shafts 12 and 13 respectively, to feed the angular quantities to the differential 8.

The difference between the distances BA and CA yields a fairly good approximation of the angle of yaw $\alpha$ or attack $\alpha_1$. This is the angle defined by the line of flight and the plane's heading. Mechanism is provided for converting this distance differential to degrees. It is easily seen that it is equal to one-half of $\theta$ less angle BDA or CDA whichever is smaller. That is, as shown in Fig. 1, $\alpha = \frac{1}{2}\theta - ADC$. A reciprocal cam 17 is connected to the output side of the differential 8 by shafts 14 and 15. The cam 17 is adopted to multiply $\theta$ by 0.5. Assuming that the smaller of the two $\theta$ component angles is an output of cam 7, that cam is connected to differential 18 by shaft 19. A second input connection for differential 18 is made to the radial follower 16 of the reciprocal cam 17 by means of shaft 20. The differential is adapted to make the required subtraction. The output of the differential is connected to dial 21 which gives a direct indication of the angle of yaw $\alpha$ or angle of attack $\alpha_1$.

There will inevitably occur to one skilled in the art various ways of mechanizing the solutions. It is therefore understood that the exclusively mechanical embodiment above described is set forth for illustration purposes only, and that the scope of the invention is to be defined in accordance with the following claim:

What is claimed is:

A flight quantity solver for computing angle of attack and angle of yaw, comprising a pair of arc sine cams, an input shaft connected to each of said cams, a differential, a cam output shaft connected between one of said cams and one input side of said differential, a second cam output shaft connected between the other cam and the other input side of said differential, a multiplier connected to the output side of said differential and capable of halving the differential output, a second differential, one input side of said second differential being connected to one of said cam output shafts and the other input side of said second differential being connected to the output of said multiplier and an indicator connected to the output of said second differential.

References Cited in the file of this patent
UNITED STATES PATENTS

| | | |
|---|---|---|
| 1,502,794 | Mouren | July 29, 1924 |
| 2,066,949 | Ruiz | Jan. 5, 1937 |
| 2,512,790 | Cleveland | June 27, 1950 |
| 2,602,587 | Dawson | July 8, 1952 |

OTHER REFERENCES

Shooley: An Approximate Supersonic Wind Tunnel Simulator, Amer. Jour. of Physics, vol. 15, No. 2, pp. 164–171. March-April 1947.

Product Engineering: September, pp. 119–123, and November, pp. 121–124, 1949 ("Mechanical Computing Mechanisms," II and IV by Robert R. Reid and Du Ray E. Stromback).